US011969722B2

(12) United States Patent
Bahar et al.

(10) Patent No.: US 11,969,722 B2
(45) Date of Patent: Apr. 30, 2024

(54) ANIONIC MEMBRANES INCORPORATING FUNCTIONAL ADDITIVES

(71) Applicant: Xergy Inc., Harrington, DE (US)

(72) Inventors: Bamdad Bahar, Georgetown, DE (US); Taoli Gu, San Jose, CA (US)

(73) Assignee: FFI Ionix IP, Inc., Wilmington, DE (US)

( * ) Notice: Subject to any disclaimer, the term of this patent is extended or adjusted under 35 U.S.C. 154(b) by 613 days.

(21) Appl. No.: 16/913,767

(22) Filed: Jun. 26, 2020

(65) Prior Publication Data

US 2020/0406248 A1 Dec. 31, 2020

Related U.S. Application Data

(60) Provisional application No. 62/867,146, filed on Jun. 26, 2019.

(51) Int. Cl.
| | |
|---|---|
| *B01D 53/22* | (2006.01) |
| *B01D 69/02* | (2006.01) |
| *B01D 69/10* | (2006.01) |
| *B01D 69/12* | (2006.01) |
| *B01D 71/72* | (2006.01) |
| *B01J 23/42* | (2006.01) |

(Continued)

(52) U.S. Cl.
CPC ............ *B01J 41/13* (2017.01); *B01D 69/02* (2013.01); *B01D 69/10* (2013.01); *B01D 69/12* (2013.01); *B01D 71/72* (2013.01); *B01J 23/42* (2013.01); *B01J 41/09* (2017.01); *B01J 41/10* (2013.01); *B01D 2325/02* (2013.01); *B01D 2325/10* (2013.01); *B01D 2325/42* (2013.01)

(58) Field of Classification Search
CPC .... B01D 69/10; B01D 2325/42; B01D 69/02; B01D 2325/10; B01D 2325/02; B01D 71/72; B01D 69/12; B01J 41/10; B01J 41/13; B01J 41/09; B01J 23/42
See application file for complete search history.

(56) References Cited

U.S. PATENT DOCUMENTS

| 7,671,157 B2 | 3/2010 | Bae |
| 9,051,431 B2 | 6/2015 | Kim |

(Continued)

FOREIGN PATENT DOCUMENTS

| WO | WO-2017172824 A1 * | 10/2017 | ............ B01D 71/44 |
| WO | 2021US14759 A1 | 1/2021 | |
| WO | 2022043650 A1 | 3/2022 | |

*Primary Examiner* — Anthony R Shumate
(74) *Attorney, Agent, or Firm* — Invention To Patent Services; Alex Hobson

(57) ABSTRACT

An ultra-thin anion exchange membrane incorporates functional additives to provide improved water management. Without the functional additives the ultra-thin membrane may have high cross-over and not be effective for many applications. A composite anion exchange membrane includes a porous scaffold support such as a porous polymer. The anion exchange polymer may be coupled to the porous scaffold, such as by being imbibed into the pores of the porous scaffold. The functional additives may contribute to increase water production, water retention, back-diffusion and reduce the gas crossover. A functional additive may include a reactive species, including a catalyst that reacts with oxygen or hydrogen, a plasticizer, a hygroscopic material and/or a radical scavenger.

21 Claims, 3 Drawing Sheets

(51) Int. Cl.
*B01J 41/09* (2017.01)
*B01J 41/10* (2006.01)
*B01J 41/13* (2017.01)

(56) References Cited

U.S. PATENT DOCUMENTS

| | | | |
|---|---|---|---|
| 10,272,424 B2 | 4/2019 | Bae | |
| 10,435,504 B2 | 10/2019 | Bae | |
| 11,040,339 B2 | 6/2021 | Bae | |
| 11,173,456 B2 | 11/2021 | Bahar | |
| 11,286,337 B2 | 3/2022 | Bae | |
| 11,339,996 B2 | 5/2022 | Bahar | |
| 11,465,139 B2 | 10/2022 | Lee | |
| 2012/0141919 A1* | 6/2012 | Lee | H01M 4/8663 |
| | | | 429/535 |
| 2014/0271774 A1* | 9/2014 | Drumheller | A61L 31/10 |
| | | | 522/167 |
| 2015/0188175 A1* | 7/2015 | Pearman | H01M 4/92 |
| | | | 429/480 |
| 2017/0252707 A1* | 9/2017 | Bahar | B01J 41/05 |
| 2017/0355811 A1* | 12/2017 | Bae | C09D 165/00 |
| 2021/0108067 A1 | 4/2021 | Chulsung | |
| 2021/0249675 A1* | 8/2021 | Kim | C25B 1/04 |
| 2021/0309818 A1 | 10/2021 | Bae | |
| 2021/0380771 A1 | 12/2021 | Bae | |
| 2022/0052357 A1 | 2/2022 | Bae | |
| 2022/0072529 A1 | 3/2022 | Lee | |
| 2022/0266239 A1 | 8/2022 | Bae | |

* cited by examiner

ANIONIC MEMBRANES INCORPORATING FUNCTIONAL ADDITIVES

CROSS REFERENCE TO RELATED APPLICATIONS

This application claims the benefit of priority to U.S. provisional patent application No. 62/867,146, filed on Jun. 26, 2019 and; the entirety of which is hereby incorporated by reference herein.

BACKGROUND OF THE INVENTION

Field of the Invention

This invention is directed to ultra-thin anion exchange membranes incorporating anion exchange polymers and functional additives and its application as self-humidification membranes for electrochemical applications incorporating anion exchange membranes.

Description of Related Art

Anion exchange membrane fuel cells (AEMFCs) have intriguing features as compared to proton exchange membrane fuel cells (PEMFCs). One of their advantage is the possibility of using non-platinum-group catalysts due to faster oxygen reduction reaction (ORR) kinetics.

Anion exchange membrane (AEM) is a critical component of AEMFCs, where hydrogen and oxygen are used to generate electricity with water as a byproduct. In an AEMFC, the following electrochemical reactions occur in the catalyst layers:

$$\text{Cathode:} O_2 + 2H_2O + 4e^- \rightarrow 4OH^- \quad (1)$$

$$\text{Anode: } 2H_2 + 4OH^- \rightarrow 4H_2O + 4e^- \quad (2)$$

In AEMFCs, anions and water are transported across the AEMs. The AEM needs to stay in hydrated state to have high ion conductivity and durability, which requires proper humidification. The water management in the AEMFCs is more complex than in the PEMFCs, as water is a product at the anode and a reactant at the cathode, back-diffusion of water from the anode to the cathode is a key parameter for high cell performance. Also, flooding may occur at the anode of AEMFCs at the same time as water is consumed at the cathode. Both these conditions are undesirable, as flooding limits the mass transport of reactants, and drying out of the cathode limits the supply of water for the cathode reaction and decreases the oxygen reduction reaction.

AEMFC humidification methods may include direct water injection and gas bubbling humidifier methods. However, the amount of water injected in the cathode inlet gas flow has to be controlled precisely to avoid water flooding. In addition, certain applications such as automotive and electronics applications prefer self-humidification of the AEM as they have limited space requirements.

The back diffusion is sufficient to humidify the cathode side membrane only when the thickness of the membrane is thin enough. However, AEMs require a higher activation energy for anion transport compared to proton transport in PEMs. To achieve high ionic conductivity and hydrophilic-domain phase separation, AEMs are designed to have high ion exchange capacities (IECs). High IEC increases water uptake and hydrophilic-domain phase separation, leading to a reduction in mechanical strength and dimensional stability. Traditionally, to combat these issues, thicker membranes were used. Thicker membranes have higher ionic resistance which also reduces the water back-diffusion in AEMFCs thereby further hampering water management in AEMFCs.

Anion exchange membrane fuel cells (AEMFCs) continue to have limited use and adoption due to the problems listed above.

SUMMARY OF THE INVENTION

The present invention provides an anion exchange membrane that is ultra-thin and comprises functional additives to provide improved water management. An exemplary anion exchange membrane may be a composite anion exchange membrane comprising a porous scaffold support. An anion exchange polymer may be coupled to the porous scaffold, such as by being imbibed into the pores of the porous scaffold. The porous scaffold may enable the composite anion exchange membrane to be ultra-thin and therefore reduce water management issues. An ultra-thin anion exchange membrane may have a thickness of about 50 μm or less, and may even be as thin as about 5 μm or less. An exemplary anion exchange polymer may include a functional polymer based on a hydrocarbon backbone with quaternary ammonium functional groups and an inert porous scaffold material for reinforcement. The functional additives may contribute to increase water production, water retention, back-diffusion and reduce the gas crossover.

The combination of ultra-thin and functional additives provides a unique combination of features that enables anion exchange membranes to operate without supplemental humidification methods. A porous scaffold supports the anion exchange polymer to make the composite dimensionally stable and durable for processing. Very thin and ultra-thin anion exchange membranes may however be susceptible to high gas crossover rates across the membrane during operation. The gas crossover rates become a serious issue for ultra-thin AEMs because polymeric membranes have inherent gas diffusivity and permeability properties. These crossover rates are reduced by the addition of a functional additive. Reactant gases that permeate into the membrane react with the functional additive and produce water. The reactant gasses may include oxygen and/or hydrogen. Furthermore, reactant gasses can have other detrimental effects to the anion exchange membrane including reacting with the anion exchange polymer and/or the reacting with the porous scaffold to reduce strength and durability.

An exemplary functional additive may comprise a reactive species, including a catalyst that reacts with oxygen or hydrogen, a plasticizer, a hygroscopic material and/or a radical scavenger. The functional additives may be included in the anion exchange membrane in a concentration of about 1% by weight or less, about 0.5% or less and in some cases about 0.1 wt % or less, and any range between and including the concentrations provided. Too much of reactive functional additives will decrease the performance of the system.

An exemplary reactive species includes, but is not limited to, $TiO_2$, $CeO_2$, $SiO_2$, carbon nanotubes, graphene, carbon black, sulfated zirconia and any combination of them. Note that the reactive species may be included as a particle in the anion exchange polymer and/or may be coupled to the porous scaffold, such as being bound in an expanded polytetrafluoroethylene, or coated onto a porous scaffold, wherein the reactive species is exposed to the anion exchange polymer at the interface between the ionomer and the porous scaffold.

The reaction of permeated may be catalyzed by the catalytic functional additive, such as platinum particles to generate water, which in turn is adsorbed and retained by the oxide particles (e.g. $SiO_2$). Moreover, the addition of $TiO_2$ enhances the back-diffusion of water that is generated by the electrochemical reaction from the cathode to the anode, owing to the hygroscopic property of $TiO_2$. Thus, the membrane at the cathode side that is dried by the electro-osmotic drag can be humidified effectively. A catalytic functional additive is a subset of a reactive species but is not consumed in the reaction. A catalyst reduces activation energy for a reaction to occur.

Functional additives may include plasticizers that increase the amorphous content of the anion exchange polymer. This increases the free volume for water to occupy, which enhances ion conductivity. Too much plasticizer decreases the glass transition temperature. Exemplary Plasticizers are selected from the group consisting of 1-Butyl-3-methylimidazolium hexafluorophosphate (BMIMPF6), 1-Hexyl-3-methylimidazolium bis(trifluoromethanesulfonyl) imide (MC6), glycerol, and Nylon 6,6.

Functional additives may include fillers such as a hygroscopic material that retain water in the membrane to improve conductivity. Exemplary fillers may include Aluminium oxide ($Al_2O_3$), Heteropolyacid (HPA)-based inorganic filler, IL-functionalised carbon materials, Carbon black(CB), Multiwallcarbon nanotubes(MWCNTs) and Reduced Graphene Oxide(RGO), Phosphoric acid-modified silica, Imidazole-modified silica, Phosphate-modified titanium zirconium oxide, and Zeolitic imidazolate framework-8 (ZIF-8).

Functional additives may include radical scavengers that improve durability of the membrane because they convert radicals into non-harmful species, which protects the anion exchange polymer or ionomer. Exemplary radical scavengers include, but are not limited to metal oxides including cerium oxide, manganese oxide, and polymers including polydopamine.

The reaction of permeated may be catalyzed by the platinum particles to generate water, which in turn is adsorbed and retained by the oxide particles (e.g. $SiO_2$). Moreover, the addition of $TiO_2$ enhances the back-diffusion of water that generated by the electrochemical reaction from the cathode to the anode, owing to the hygroscopic property of $TiO_2$. Thus the membrane at the cathode side that dried by the electro-osmotic drag can be humidified effectively.

Exemplary anion exchange polymers may have backbones selected from the group of Polysulfones, Polyphenylenes, Poly(arylene ether ketones), Poly(phenylene oxides), Polystyrenes, Polynorbornenes, Polybenzimidazoliums, Polypropylenes, Polyethylenes, and fluorinated hydrocarbon or carbon-based polymers. Exemplary anion exchange polymers may have functional groups selected from the group of quaternary ammonium, tertiary diamines, phosphonium, benz(imidazolium), sulphonium, guanidinium, metal cations, pyridinium.

Anion exchange membranes as described herein may be use in AEMFCs, electrolyzes, sensors, compressors, batteries, super capacitors.

EXAMPLES

In one embodiment, a membrane is prepared by dissolving the anion exchange polymer in isopropyl alcohol at a 3% weight ratio, i.e. 0.3 grams of polymer to 9.7 grams of solvent. Then 0.06 grams of $TiO_2$, 0.2 grams of $SiO_2$ and 0.01 grams Pt Black are added into the solution. The mixture was stirred until homogenous.

The polymer solution was then applied to a microporous polyethylene material tensioned around a chemically resistant plastic frame. The polymer solution was then poured on to the microporous scaffold. The frame was covered with a lid to slow solvent evaporation. The membrane was dried at room temperature. The final thickness of the membrane was 5 micrometers.

In another embodiment, a membrane is prepared by dissolving the polymer in isopropyl alcohol at a 5% weight ratio i.e. 0.5 grams of polymer to 9.5 g of solvent. Then 0.06 grams of $CeO_2$, 0.25 grams of $SiO_2$ and 0.01 grams carbon nanotubes are added into the solution. The mixture was stirred until homogenous.

The polymer was then applied to a microporous poly (tetrafluoroethylene) material with a doctor blade. The membrane was dried at room temperature. The final thickness of the membrane was 10 microns.

It will be apparent to those skilled in the art that the latter embodiment can be scaled up to a roll-to-roll, continuous process.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1A:
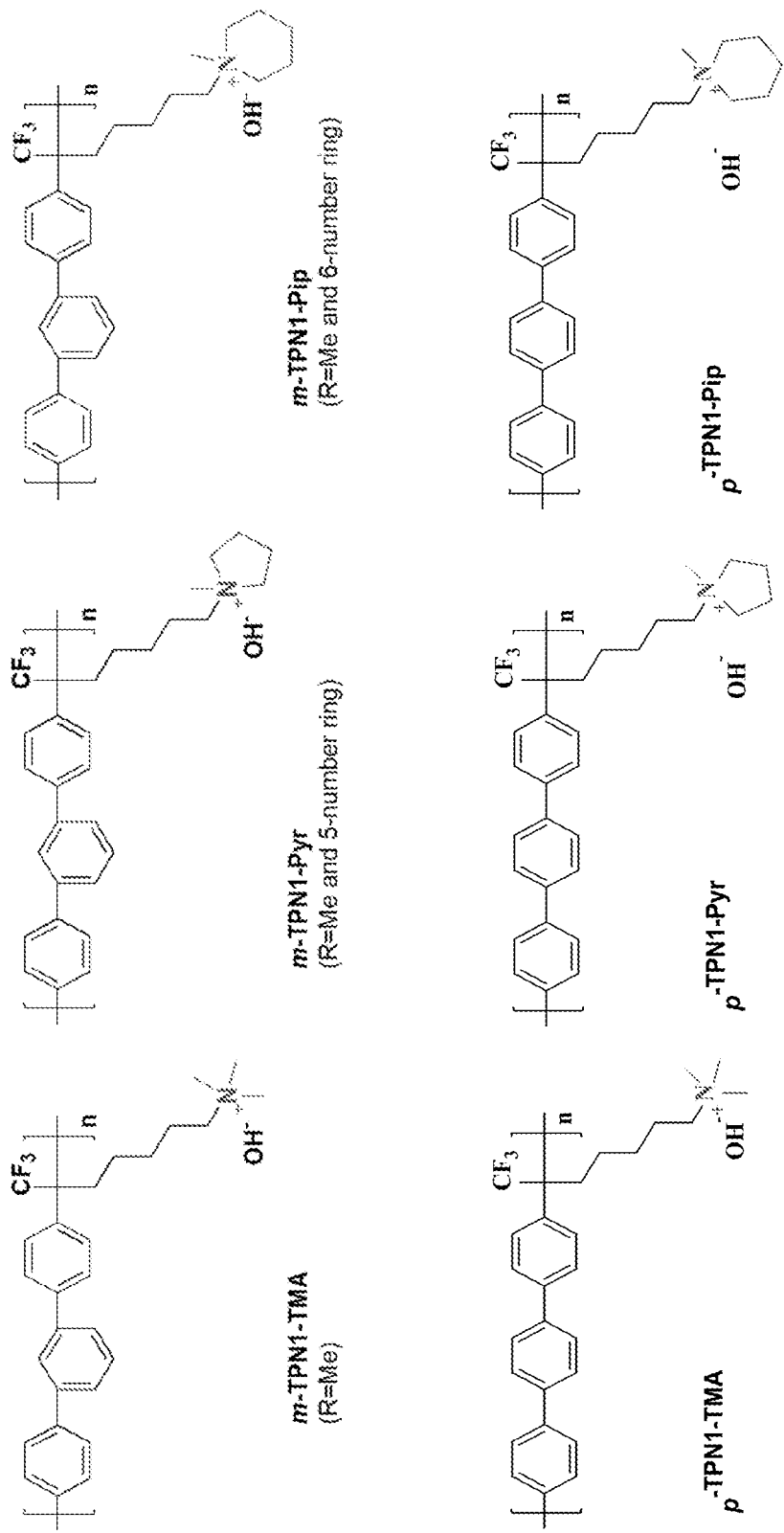
FIGS. 1A and 1B show exemplary anion exchange polymers.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1B:
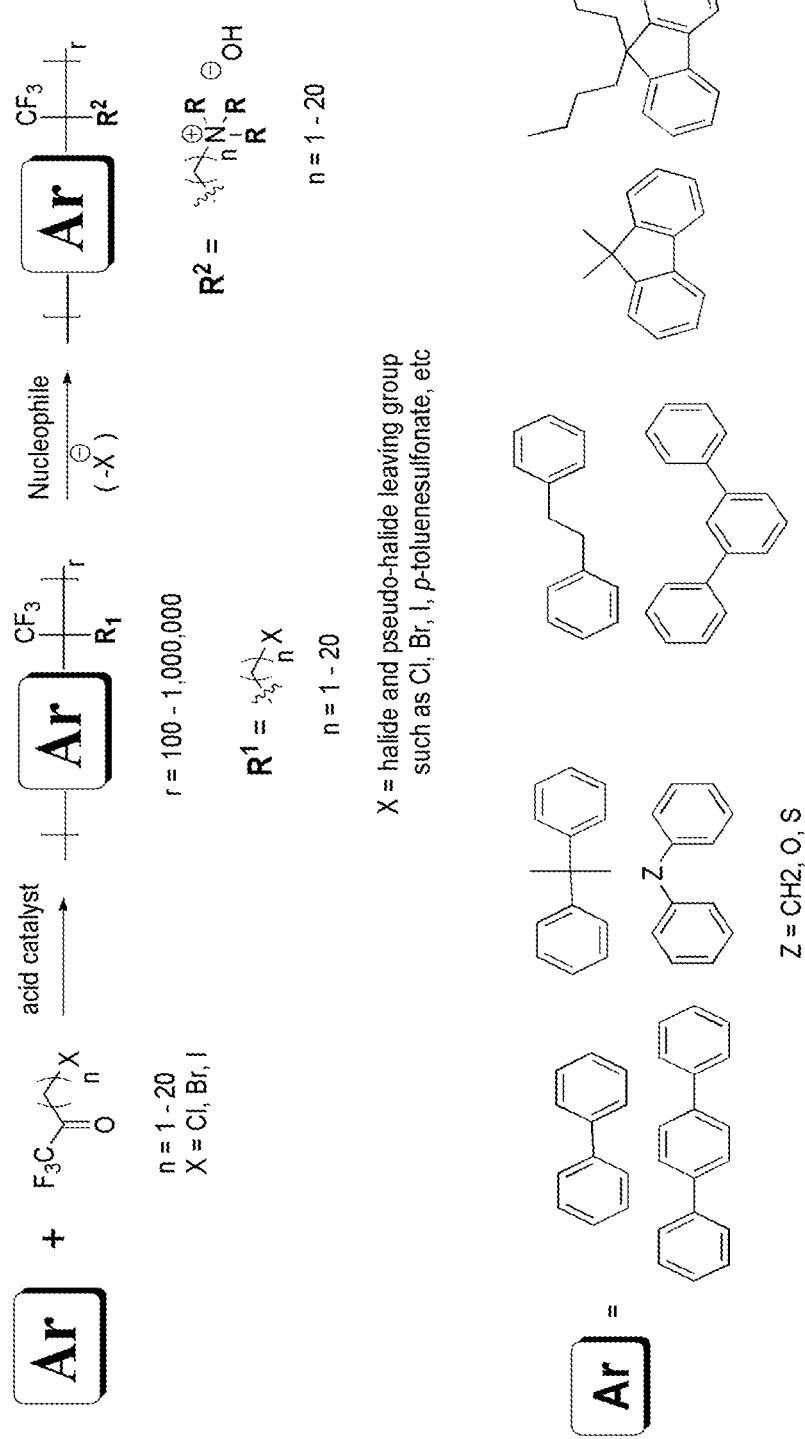

FIGS. 1A and 1B show exemplary anion exchange polymers. Exemplary anion exchange polymers are composed of an aromatic/polyaromatic ring in polymer backbone, such as biphenyl, terphenyl, fluorenyl, and a tethered alkyl halide (e.g. bromide) side chain which can be converted to quaternary ammonium hydroxide groups.

Figure 2:
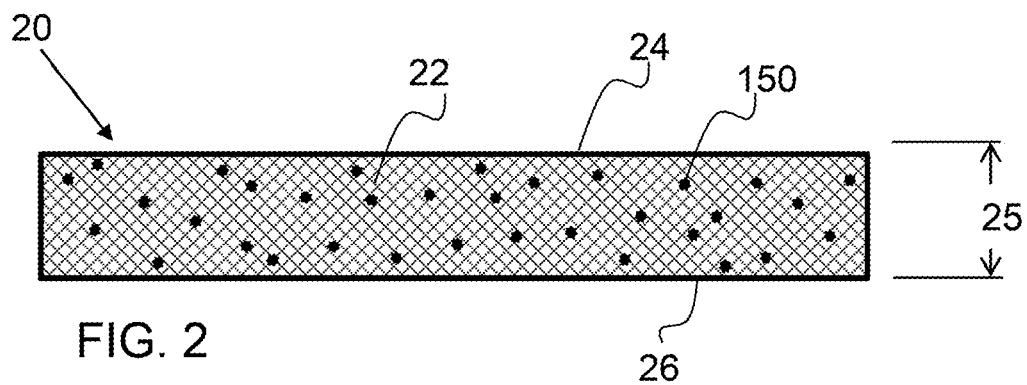
FIG. 2 shows a cross-sectional view of an exemplary porous scaffold having functional additives coupled thereto.

FIG. 2 shows a cross-sectional diagram of a porous scaffold 20 having a thickness 25 from a first side 24 and an opposite second side 26. As described herein the thickness may be ultra-thin, such as about 50 µm or less, about 35 µm or less, about 25 µm or less, about 20 µm or less, about 15 µm or less, about 10 µm or less, about 5 µm or less and any range between and including the thickness values provided, such as between about 5 µm and 25 µm. The porous scaffold has pores 22 and an open structure extending from the first side 24 to the second side 26, allowing for a flow of appropriate fluid or anion exchange polymer to imbibe the pores from the first to the second side. The porous scaffold is air permeable when not imbibed with the anion exchange polymer. Also, the porous scaffold may include functional additives 150 coupled to the structure, such as being bound to the porous scaffold. A functional additive may be coated onto the porous scaffold and adhered by a melting of the polymer of with a binder or adhesive. The functional additive may be incorporated into the polymer of the porous scaffold such as by blending prior to melt processing, or by co-coagulation, such as during co-coagulation with polytetrafluoroethylene. As discussed herein, the porous scaffold may be a polymer, such as an expanded polymer including, but not limited to, a fluoropolymer, expanded polytetrafluoroethylene (ePTFE), a hydrocarbon polymer such as polyethylene, polypropylene polyether-ether-ketone, (PEEK), and the like.

Figure 3:
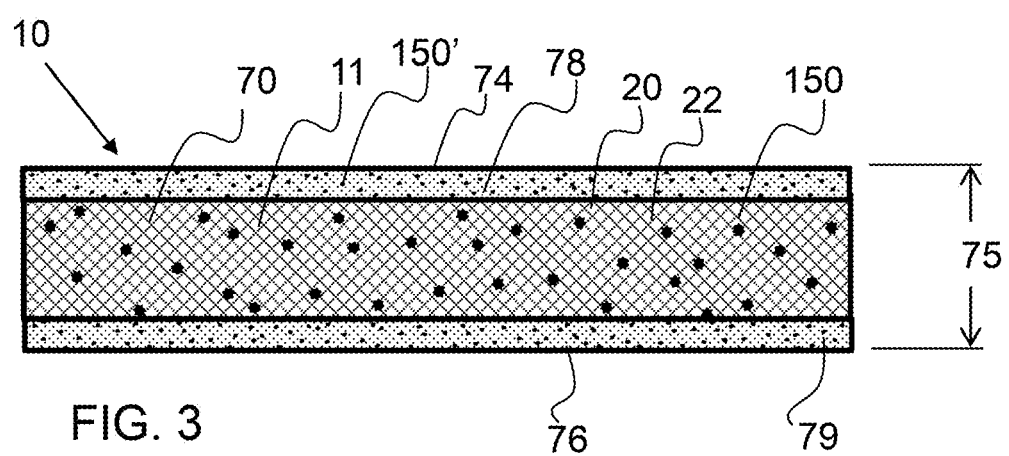
FIG. 3 shows a cross-sectional view of an exemplary composite ultra-thin anion exchange membrane having a porous scaffold and an anion exchange polymer configured within the pores of the porous scaffold and functional additives.

FIG. 3 shows a cross-sectional diagram of an exemplary ultra-thin anion exchange membrane 10 which is a composite anion exchange membrane 11 comprising a porous scaffold 20 imbibed with an anion exchange polymer 70. The anion exchange polymer forms surface layers 78 and 79 on the two faces or opposing surfaces of the imbibed porous scaffold. These surface layers are the anion exchange polymer extending from the porous scaffold 20. Note that a surface layer may be configured on only one side or surface of the composite anion exchange membrane 11. The anion exchange polymer may include a functional additive 150' and this functional additive may be configured in the surface layers and throughout the polymer within the pores 22 of the porous scaffold. The thickness 75 of the composite anion exchange membrane extends from the first side 74 to the second side 76 and as described herein may be ultra-thin, such as about 50 µm or less, as about 35 µm or less, about 25 µm or less, about 20 µm or less, about 15 µm or less, about 10 µm or less, about 5 µm or less and any range between and including the thickness values provided, such as between about 5 µm and 25 µm. Also, the porous scaffold may include a functional additive 150 and this functional additive may be a different functional additive from the functional additive in the anion exchange polymer, such as different chemically having a different chemical structure, or different in physical structure, such as having a different size. The functional additive coupled to the porous scaffold may have a different volumetric concentration than the functional additive configured with the anion exchange polymer.

Figure 4:
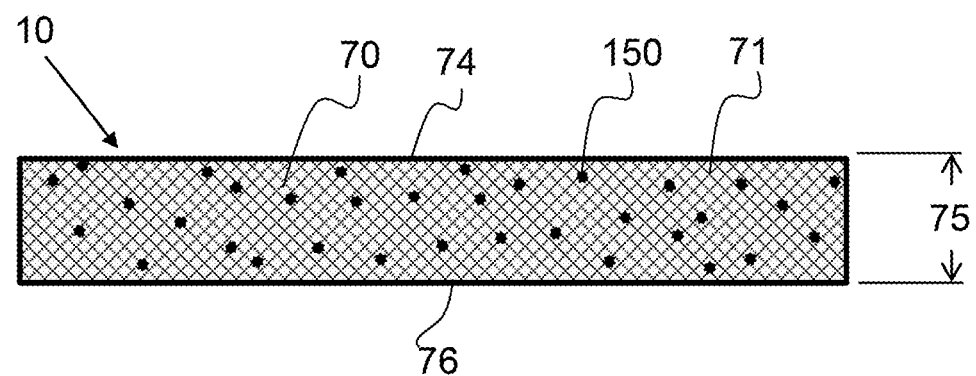
FIG. 4 shows a cross-sectional view of an exemplary ultra-thin anion exchange membrane including functional additives.

FIG. 4 shows a cross-sectional diagram of an ultra-thin anion exchange membrane 110 comprising functional additives 150'. Optionally, the anion exchange polymer may be a cross-linked anion exchange polymer 71. The ultra-thin anion exchange membrane has a thickness 75 from a first side 74 to a second side 76.

What is claimed is:

1. An anion exchange membrane comprising:
   a) an anion exchange polymer comprising:
      i) polyphenylenes homopolymer backbones with side chain consisting of hydrophilic side chains with a $CF_3$ linkage to said backbone; and
      ii) said hydrophilic side chains being linear hydrocarbon side chains having functional groups;
      wherein the anion exchange polymer extends as a first surface layer on a first side and as a second surface layer on a second side, opposing said first side, of the anion exchange membrane;
   b) a functional additive configured within the anion exchange membrane, between said first surface layer of said anion exchange polymer and said second surface layer of said anion exchange polymer, wherein the functional additive comprises a radical scavenger comprising polydopamine.

2. The anion exchange membrane of claim 1, further comprising a porous scaffold.

3. The anion exchange membrane of claim 2, wherein the porous scaffold comprises a porous polymer.

4. The anion exchange membrane of claim 3, wherein the porous polymer is selected from the group consisting of: polyethylene, polypropylene, polyether-ether-ketone (PEEK), and poly(tetrafluoroethylene).

5. The anion exchange membrane of claim 1, wherein the thickness of the anion exchange membrane is no more than 50 µm.

6. The anion exchange membrane of claim 1, wherein the polyphenylenes backbones are aryl ether linkage free.

7. The anion exchange membrane of claim 1, wherein the functional groups of the anion exchange polymer is selected from the group of consisting of: quaternary ammonium, tertiary diamines, phosphonium, benz(imidazolium), sulphonium, guanidinium, metal cations, and pyridinium.

8. The anion exchange membrane of claim 1, wherein the functional additive further comprises reactive species selected from the group consisting of: carbon nanotubes, graphene, carbon black, sulfated zirconia and any combination of them.

9. The anion exchange membrane of claim 1, wherein the functional additive further comprises a catalyst.

10. The anion exchange membrane of claim 9, wherein the catalyst comprises platinum or a platinum group metal.

11. The anion exchange membrane of claim 9, wherein the catalyst is configured in the anion exchange polymer.

12. The anion exchange membrane of claim 9, wherein the catalyst is coupled to the porous scaffold.

13. The anion exchange membrane of claim 1, wherein the functional additive further comprises a plasticizer in the anion exchange polymer.

14. The anion exchange membrane of claim 13, wherein the plasticizer is selected from the group consisting of: 1-Butyl-3-methylimidazolium hexafluorophosphate (BMIMPF6), 1-Hexyl-3-methylimidazolium bis(trifluoromethanesulfonyl) imide (MC6), glycerol, and Nylon 6,6.

15. The anion exchange membrane of claim 1, wherein the functional additive further comprises a hygroscopic material.

16. The anion exchange membrane of claim 15, wherein the hygroscopic material is selected from the group consisting of: Aluminium oxide (Al2O3), Heteropolyacid (HPA)-based inorganic filler, IL-functionalised carbon materials, Carbon black, Multiwallcarbon nanotubes, Reduced Graphene Oxide, Phosphoric acid-modified silica, Imidazole-modified silica, Phosphate-modified titanium zirconium oxide, and Zeolitic imidazolate framework-8 (ZIF-8).

17. The anion exchange membrane of claim 1, wherein the hygroscopic material is configured in the anion exchange polymer.

18. The anion exchange membrane of claim 1, wherein the radical scavenger further comprises cerium oxide.

19. The anion exchange membrane of claim 1, wherein the radical scavenger is configured in the anion exchange polymer.

20. The anion exchange membrane of claim 1, wherein the radical scavenger further comprises manganese oxide.

21. The anion exchange membrane of claim 1, further comprising a porous scaffold and wherein at least a portion of the polydopamine configured within the anion exchange membrane is coupled to said porous scaffold.

* * * * *